United States Patent [19]

De Braal et al.

[11] Patent Number: 5,251,959
[45] Date of Patent: Oct. 12, 1993

[54] ADJUSTABLE WALL-MOUNTED LOCOMOTIVE SEAT SUPPORT

[75] Inventors: Allen M. De Braal, Downers Grove; Harvey C. Boyd, Woodridge, all of Ill.

[73] Assignee: General Motors Corporation, Detroit, Mich.

[21] Appl. No.: 746,647

[22] Filed: Aug. 15, 1991

[51] Int. Cl.⁵ .............................................. A61G 15/00
[52] U.S. Cl. .................................. 297/344.1; 297/313; 297/248
[58] Field of Search ............... 297/344, 348, 326, 329, 297/138, 143, 257, 313; 248/286, 291, 288.1, 240, 214, 425

[56] References Cited

U.S. PATENT DOCUMENTS

| | | | |
|---|---|---|---|
| 1,662,378 | 3/1928 | Duke | 297/257 |
| 2,625,426 | 1/1953 | Weymouth | 248/291 X |
| 2,865,589 | 12/1958 | D'Azzo | 248/286 X |
| 2,952,366 | 9/1960 | Botten | 248/240 X |
| 3,000,605 | 9/1961 | Jahn | 248/240 |
| 3,131,964 | 5/1964 | Reed | 248/240 X |
| 3,233,745 | 2/1966 | Herschberger | 248/240 X |
| 3,718,365 | 2/1973 | Gibson | 297/344 X |
| 3,951,449 | 4/1976 | Crowther | 297/349 X |
| 4,108,493 | 8/1978 | Naus | 297/337 |

Primary Examiner—Kenneth J. Dorner
Assistant Examiner—Milton Nelson, Jr.
Attorney, Agent, or Firm—Robert J. Outland

[57] ABSTRACT

A cab side wall mounted seat support has a slide assembly, typically a bar and sleeve assembly, attached to the wall and coupled by an upper arm support to a seat socket. A lower arm has a peg which engages one of a series of holes in the wall for locking the seat in place. The slide assembly includes a rotation function allowing the socket to be raised to release the peg from the hole for seat adjustment. Alternatively, the upper arm support is hinged to permit such release. One embodiment uses a roller on the lower arm instead of the peg and a spring loaded locking pin in the slide assembly releasably holds the seat in place.

16 Claims, 3 Drawing Sheets

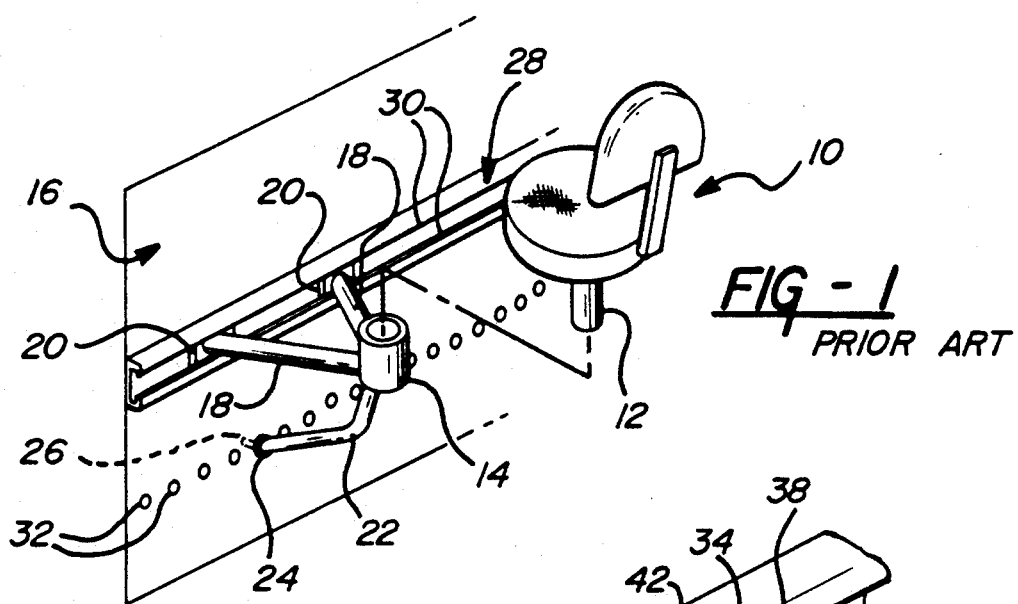
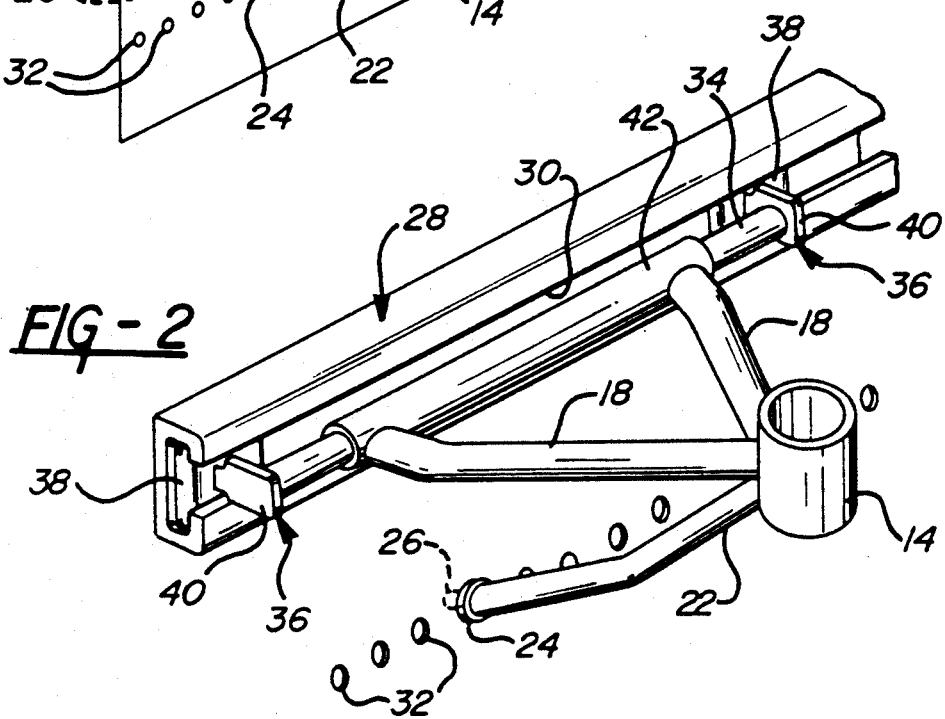
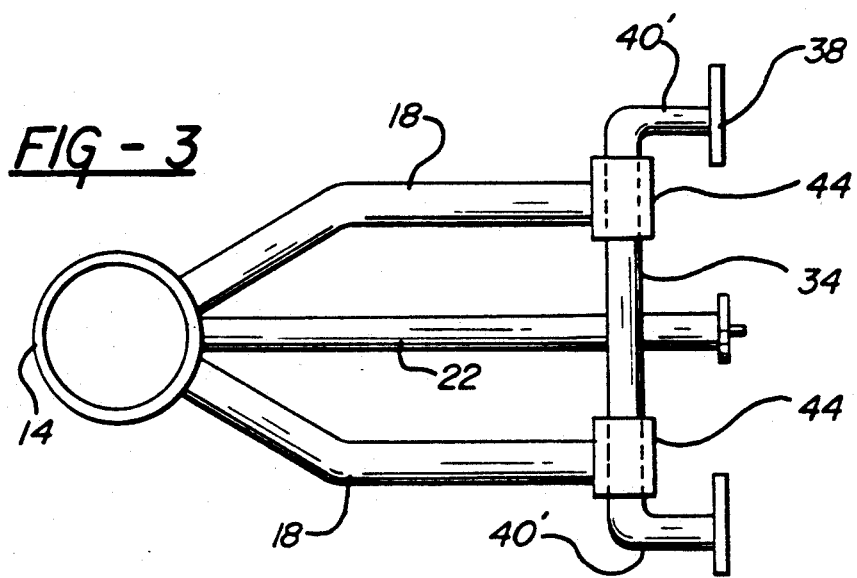

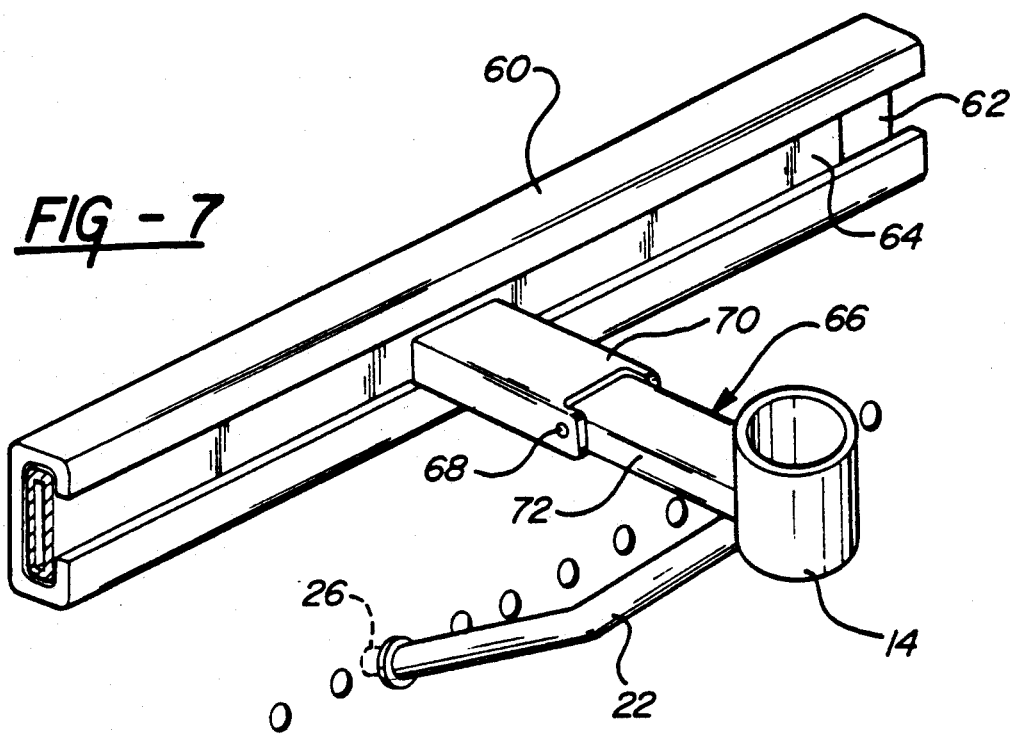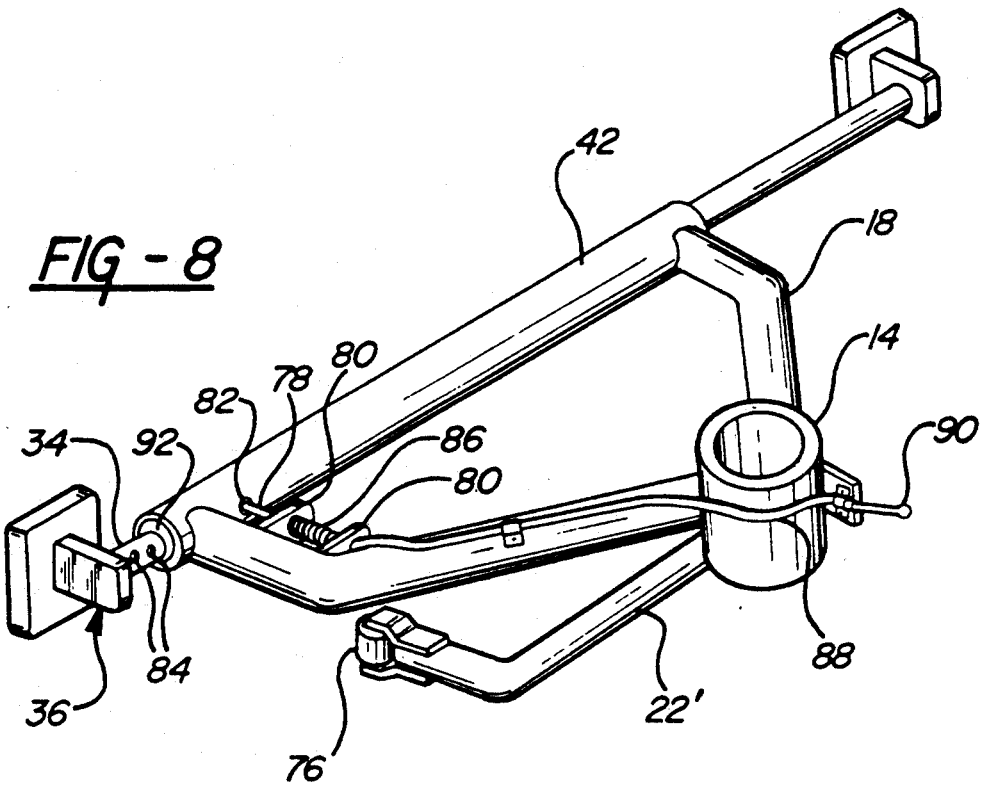

ADJUSTABLE WALL-MOUNTED LOCOMOTIVE SEAT SUPPORT

TECHNICAL FIELD

This invention relates to locomotive seats and particularly to adjustable seat supports for locomotives.

BACKGROUND

It is known in the art relating to locomotive seats to slidably mount a seat on the cab side wall to permit fore and aft movement of the seat. FIG. 1 illustrates such an arrangement wherein a seat 10 has a supporting center post 12 which is received in a tubular socket 14 having a vertical center axis. The socket 14 is supported from the cab side wall 16 by a pair of upper arms 18 welded at one end to the socket and terminating in flat plates 20 on the other end, and by a lower arm or diagonal brace 22 which terminates in a lower end 24 having a small diameter peg 26 projecting therefrom. A horizontal track 28 on the side wall 16 has upper and lower flanges 30 which define slots that loosely grip the upper and lower edges of the plates 20 thus allowing the plates to slide in the track for fore and aft movement of the seat. A series of holes 32 in the wall below the track 28 are horizontally aligned with the peg 26 of the diagonal brace 22. For a given seat position, the peg 26 engages one of the holes 32 and locks the seat into that position. In addition, the brace 22 helps support the seat by bearing against the wall 16.

To adjust the seat of FIG. 1, it is necessary to pull up on the seat or socket to disengage the peg 26 from its hole 32, and slide the mechanism along the track 28 to a new position. Thus to accommodate the upward tilting movement to release the peg 26, the plates 20 must fit loosely in the track 28 to tilt or cock the necessary amount and still be able to slide in the track while cocked. In a new installation this is readily accomplished but with age the accumulation of dirt, corrosion, or even paint in the track makes the seat more difficult to move; the plates 20 may not tilt so easily and may bind in the track when sliding is attempted.

SUMMARY OF THE INVENTION

The present invention is directed to improvements in locomotive seat design to allow easy sliding movement which is less likely to deteriorate with age or use and which is readily retrofitted to existing locomotives or installed in new ones.

These and other features and advantages of the invention will be more fully understood from the following descriptions of certain specific embodiments of the invention taken with the accompanying drawings.

BRIEF DRAWING DESCRIPTION

In the drawings:

FIG. 1 is an isometric view of a prior art sliding locomotive seat:

FIG. 2 is an isometric view of a slidably adjustable locomotive seat according to a first embodiment of the invention;

FIG. 3 is a plan view of a slidably adjustable locomotive seat according to a second embodiment of the invention; and FIGS. 4 through 8 are isometric views according to additional embodiments of the invention.

DETAILED DESCRIPTION

Figure 4:
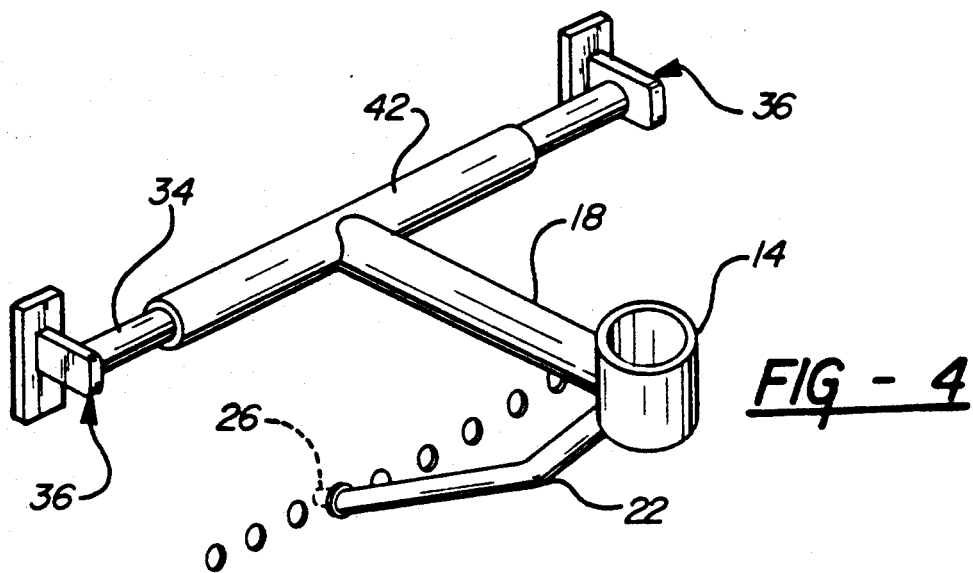

Referring to FIG. 2, a seat support incorporates a number of features of the FIG. 1 design including the seat socket 14, the upper arms 18 and lower arm or diagonal brace 22 with peg 26, as well as the track 28 and the holes 32 which are fixed to or are a part of the locomotive cab side wall. A horizontal bar 34 is attached at each end to the track 28 by a bracket 36 which has a pad 38 (similar to plate 20) which fits within the track and an outboard plate 40 perpendicular to the wall which is secured to and extends laterally from the bar 34. A tube or sleeve 42 substantially shorter than the bar 34 and larger in inner diameter than the bar outer diameter is mounted on the bar for free sliding and rotating movement thereon. The upper support arms 18 are attached to either end of the sleeve 42 to thereby mount the seat socket 14 to the sleeve. Thus the seat socket 14 is easily moved by tilting the assembly upwardly to remove the peg 26 of the lower arm from the hole 32, thereby rotating the sleeve on the bar 34, and then sliding the sleeve 42 along the bar to another position where the peg 26 is placed in another hole. The upper support arms and the bar and sleeve arrangement comprise a lateral support capable of raising the seat socket and sliding adjustment. The pads 38 slide into the track 28 for retrofit installation of the seat support on a locomotive having such a track. For initial placement or for later gross adjustment the pads are positioned along the track as desired. For a new installation or for one not having a track 28, the track is not necessary and the pads can be bolted or welded directly to the side wall of the cab.

As shown in FIG. 3, the one-piece sleeve 42 of the FIG. 2 embodiment may be replaced by two separate short sleeves 44, each attached to an upper arm 18. In either configuration the sleeve may incorporate bearings to facilitate smooth sleeve movement along the bar 34. Also the bracket configuration may be altered by bending the ends of the bar 34 at 90 degrees and attaching the pads 38 directly to the laterally extending bar ends 40'.

Still another version of the sleeve and bar sliding seat support uses a single upper arm 18' which is attached to the center of the sleeve 42 and to the seat socket 14 as shown in FIG. 4. The assembly is otherwise the same as in FIG. 2.

Figure 5:
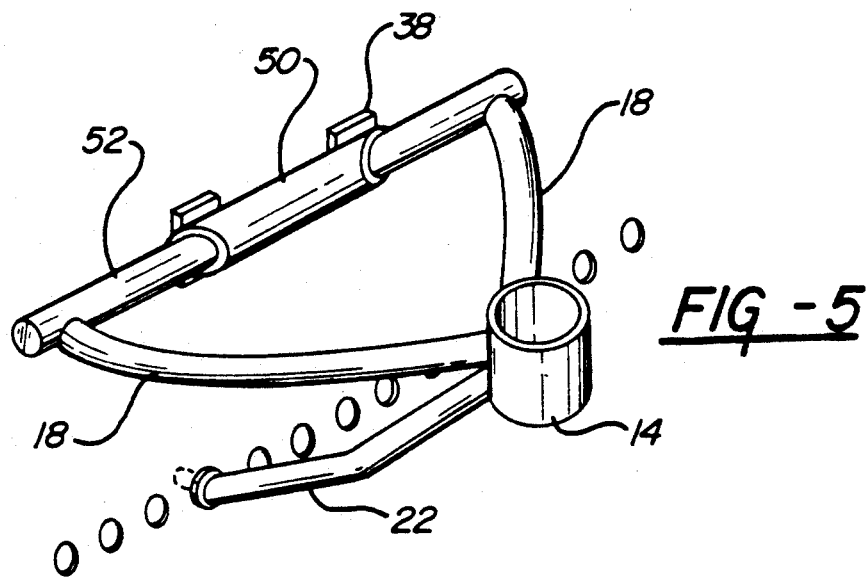

An inversion of the sleeve and bar sliding seat support design is illustrated in FIG. 5. There, a short sleeve 50 has a pair of track mounting pads 38 welded directly thereto for attachment to the cab side wall track, and a bar or tube 52 is slidably disposed within the sleeve. The bar 52 is much longer than the sleeve and upper arms 18 are attached to and extend laterally from either end of the bar 52 to attachment with the socket 14 so that the bar can slide within the sleeve 50 for seat adjustment. The bar, of course also rotates in the sleeve about the longitudinal axis of the bar. The ends of the short sleeve 50 are cut at an angle such that the side of the sleeve facing the socket 14 has a small dimension to maximize the range of sliding movement of the bar 52 without interference of the arms 18 and the sleeve.

Figure 6:
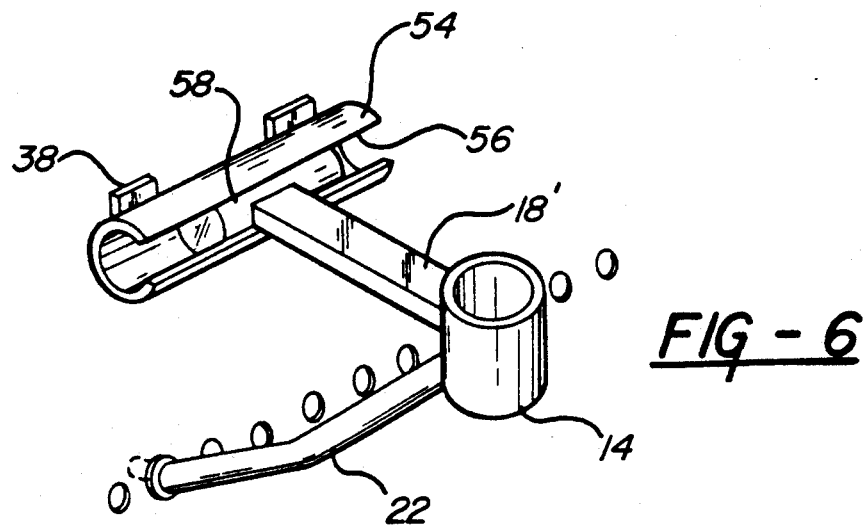

FIG. 6 utilizes an open sided or C-shaped sleeve 54 defining a slot 56 which completely avoids any interference with upper support arms or a single arm 18' as shown. Mounting pads 38 are secured to the back of the sleeve 54. A bar 58 slides within the sleeve 54 and carries the arm 18' which extends through the slot 56 to the socket 14. Two arms attached to the bar 58 could be used if desired. A lower arm or diagonal brace 22 extends from the socket 14 to the wall as in the examples above. The slot 56 is sufficiently wider than the arm 18' thickness to allow room for tilting the arm for disengaging the lower arm 22 from the wall. The slot 56 is smaller than the diameter of the bar 58 to retain the bar within the sleeve.

A variant of the FIG. 6 open sleeve concept is shown in FIG. 7 wherein a retaining channel 60 is mounted directly to the cab side wall (or mounted via pads to an existing track). The channel has a generally rectangular cross section with an open side or slot 62. A tubular slide 64, also of rectangular cross section, is disposed within the channel 60 for sliding movement only, having insufficient play in the channel to rotate about the longitudinal sliding axis. An articulated arm 66, hinged at a pivot pin 68 extends through the slot for attachment at one end to the slide 64 and the other end is attached to the seat socket 14. The arm 66 is formed of two channel members 70, 72, sized for one to fit within the other at the hinged joint so that the pivot pin 68 passes through both members. A lower arm 22 extends from the socket 14 to the side wall where a peg 26 on the arm 22 engages a hole, not shown, in the wall. To disengage the peg 26 from the wall for seat adjustment, the seat socket is lifted, bending the arm 66 at the joint. Then the slide 64 is moved to a new position and the socket 14 is lowered to engage the peg 26 in another hole.

The embodiment of the seat support shown in FIG. 8 does not require that the socket 14 be raised during seat adjustment and thus rotation or pivoting of the support arms is not required. It is then practical for the seat occupant to adjust the seat without getting up. As in FIG. 2, a bar 34 supported on laterally extending brackets 36 carries a tubular sleeve 42 which is slidable along the bar. Upper arms 18 secure the seat socket 14 to the sleeve 42 and a lower arm or diagonal brace 22' extends from the socket 14 to the side wall. Instead of a peg on the end of the arm 22', the arm carries a roller 76 which rides along the wall during seat adjustment. Since there is no peg-and-hole locking arrangement, there is no need to raise the seat to disengage the peg from the hole. A locking pin 78 carried by guides 80 on one of the arms 18 extends through an aperture 82 in the wall of the sleeve 42 and into one of a row of holes 84 in the bar 34. A spring 86 between the guides 80 biases the pin into a hole, and a cable 88 with a ring pull 90 mounted on the socket 14 is adapted to release the pin from the bar 34 upon manual actuation. Thus the occupant can reach the ring pull 90 to release the pin 78 from the bar to allow seat adjustment. Bearings 92 such as ball bearings within the sleeve 42 would ease the sliding effort.

Each of the embodiments can incorporate bearings to facilitate sliding of the sleeve or bar. In each example where a bar is used, the bar may be solid or tubular.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A seat support for attachment to a locomotive cab side wall having a series of apertures in the wall and adapted for fore and aft sliding adjustment, comprising:

wall bracket means;

a seat socket for holding a seat;

a diagonal brace extending from the seat socket to an aperture in the wall for holding the seat socket against sliding adjustment;

a lateral support coupled to the wall bracket means and extending from the wall bracket means to the seat socket, the support including a bar and sleeve means for sliding adjustment and for tilting to release the diagonal brace from the said aperture; and the lateral support including arm means extending from one of the bar and sleeve means to the seat socket.

2. The invention as defined in claim 1 wherein the bar is fixed to the wall bracket means and the sleeve means is fixed to the arm means such that the sleeve means slides on the bar to effect sliding of the arm means and the sleeve means rotates around the bar to effect tilting of the arm means.

3. The invention as defined in claim 1 wherein the sleeve means is fixed to the wall bracket means and the bar is slidably and rotatably disposed within the sleeve means, and the arm means is fixed to the bar to effect sliding and tilting of the arm means.

4. The invention as defined in claim 1 wherein the sleeve means is fixed to the wall bracket means and comprises a C-shaped cross section tube defining a slot along one side, the bar is slidably and rotatably disposed within the sleeve means, and the arm means is fixed to the bar and extends through the slot to effect sliding and tilting of the arm means.

5. The invention as defined in claim 1 wherein the arm means comprises at least one arm.

6. The invention as defined in claim 1 wherein:
the bar is fixed to the wall bracket means;
the sleeve means comprises two axially spaced tubes slidably and rotatably mounted on the bar; and
the arm means comprises two arms connected to the seat socket, each arm extending to one of the two axially spaced tubes.

7. The invention as defined in claim 1 wherein the bar and sleeve means are coupled by bearings for enhanced ease of relative movement.

8. The invention as defined in claim 1 wherein one of the bar and sleeve means connects with means extending laterally from one of said bar and sleeve means which allow relative axial sliding motion but prevent axial separation of the bar and sleeve.

9. A seat support for attachment to a locomotive cab side wall and adapted for fore and aft sliding adjustment, the support comprising:

wall bracket means;

a seat socket for holding a seat;

a diagonal brace extending from the seat socket to the wall below the bracket means for support and for releasably holding the seat socket against sliding adjustment;

a lateral support coupled to the wall bracket means and extending from the wall bracket means to the seat socket, the lateral support comprising arm means attached at one end to the seat socket and a pair of relatively sliding members attached to the wall bracket means and the arm means, respectively, the sliding members being mounted for fore and aft sliding to permit moving the arm means in the direction of adjustment; and the lateral support having hinge means for permitting the seat socket to be tilted upwardly to release the diagonal brace from the wall.

10. The invention as defined in claim 9 wherein the hinge means is incorporated in the sliding members.

11. The invention as defined in claim 9 wherein the arm means is articulated to incorporate the said hinge means.

12. The invention as defined in claim 9 wherein one of the relatively sliding members connects with means extending laterally from one of said relatively sliding members which allow relative axial sliding motion but prevent axial separation of the sliding members.

13. A seat support attachment to a locomotive cab side wall and adapted for fore and aft sliding adjustment, the support comprising:
   wall bracket means;
   a seat socket for holding a seat;
   a diagonal brace extending from the seat socket to the wall below the bracket means for support;
   a lateral support coupled to the wall bracket means and extending from the wall bracket means to the seat socket, the lateral support comprising arm means attached at one end to the seat socket and at least one relatively sliding member attached to the wall bracket means and the arm means, respectively, the at least one sliding member being mounted for fore and aft sliding to permit moving the arm means in the direction of adjustment; and
   locking means releasably holding the seat socket against sliding adjustment, the lateral support having hinge means permitting the seat socket to be tilted upwardly, moving the diagonal brace out of contact with the wall.

14. The invention as defined in claim 13 wherein the at least one relatively sliding member includes a bar and sleeve.

15. The invention as defined in claim 14 wherein the locking means is associated with the bar and sleeve.

16. The invention as defined in claim 14 wherein the locking means is associated with the diagonal brace.

* * * * *